June 21, 1960

R. G. GRANT 2,941,793

MECHANISM FOR DETECTING AND INDICATING LUMBER
PIECES WHICH CONTAIN EXCESS MOISTURE

Filed Nov. 27, 1956

INVENTOR.
ROBERT GENE GRANT

BY

Reynolds, Beach & Christensen

ATTORNEYS

June 21, 1960

R. G. GRANT 2,941,793

MECHANISM FOR DETECTING AND INDICATING LUMBER
PIECES WHICH CONTAIN EXCESS MOISTURE

Filed Nov. 27, 1956

INVENTOR.
ROBERT GENE GRANT
BY
Reynolds, Beach & Christensen
ATTORNEYS

United States Patent Office 2,941,793
Patented June 21, 1960

2,941,793

MECHANISM FOR DETECTING AND INDICATING LUMBER PIECES WHICH CONTAIN EXCESS MOISTURE

Robert Gene Grant, Tacoma, Wash., assignor to Cheney Lumber Company, Inc., Tacoma, Wash., a corporation of Washington Filed Nov. 27, 1956, Ser. No. 624,563

15 Claims. (Cl. 265—27)

This invention relates to apparatus for detecting and marking individual pieces of lumber which have received insufficient drying and which occur among adequately dried pieces of similar dimensions, are more particularly for performing such a culling operation on a rapid production line basis. The invention is herein illustratively described by reference to its presently preferred form as applied to the marking of 2 by 4 studs; however, it will become evident that certain changes and modifications therein with respect to details may be made without departing from the essential features involved.

Green lumber should be dried to a given moisture content before it is shipped or used. Excessive moisture content may be detected by its effect on the weight of a piece of lumber. While the weighing of individual pieces of lumber of varying dimensions may be impractical, still in certain lumber mill operations, such as in modern stud mills, the lumber pieces are all of equal size, making possible the rapid and accurate culling operation performed by the present device which operates on the principle of comparing the weight of each stud with a standard or norm.

Another object of this invention is the provision, in combination with the production line weighing apparatus, of means automatically marking the individual pieces which are overweight and therefore which contain excess moisture, so that they can be sorted out later and without necessity for removing them at an inconvenient time or location in their production flow.

Such automatic weighing and marking operations are performed preferably while the pieces are advancing from the drying kiln or during some other convenient stage in their manufacture or handling, and without incurring any appreciable delay in the overall production process.

The principal object of the invention having been indicated above, further and detailed objects, together with the novel features and combinations representing the invention, will appear more fully hereinafter.

Figure 1:
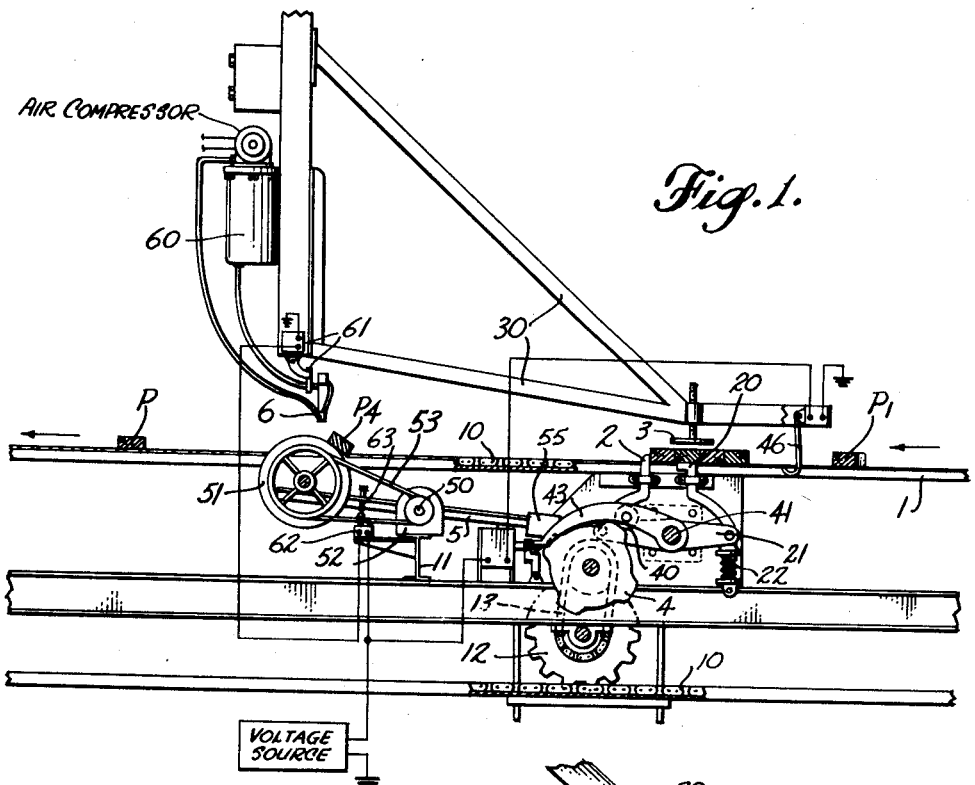
Figure 1 is a longitudinal vertical section through the machine.

The lumber pieces, indicated in general or collectively by the letter P, and individually by that letter and a suffix, are advanced edgewise along a table 1 by chains 10 whereon they rest. The advance of the pieces P is impositive, for the chain 10 advances continually, while the pieces may be halted and collected at a stop station, before continuing their advance. Their halting is effected by two stop members 2 which stand up in the path of advance of the lumber pieces at two points spaced transversely in the path of the lumber pieces, and constituting a stop station. The two stop members 2 cause the lumber pieces to be oriented transversely of the length of the feed table, wherefore both ends will pass simultaneously over a scale beam, later referred to, whereas many of the pieces approaching the stops, as indicated by the piece $P_1$ for instance, may have been initially canted at an angle to the direction of advance other than at a right angle.

The stop means 2 are normally upraised above the table 1 by an amount to engage and halt the pieces as they are advanced by the chains 10, but at this point there is an escapement device for permitting single pieces P to advance beyond the stop means 2, and to hold back all others collected at this point. The escapement mechanism includes a pair of presser feet 20 spaced apart transversely of the feed table 1 and normally depressed below the surface of such table, but movable, in alternation with the stop members 2, upwardly above the table 1 as the stop members 2 are depressed below the same. Each presser foot is positioned in such relation to the corresponding stop member 2, in the direction lengthwise of the table, that the presser foot 20 will engage the next succeeding piece P2 beyond the first-halted piece P3, and will press this piece P2 upwardly and clamp it against a fixedly positioned shoe 3 with sufficient force to hold the piece P2, and all pieces which follow the latter, against advance. Meanwhile, the piece P3 continues on, being advanced by the chains 10. The two shoes 3 are supported for vertical adjustment in a supporting structure 30 overlying the table 1.

Vertical reciprocative movements of the members 2 and 20, in the respective guides 8 and 28, are effected by pivotally mounting them on the opposite ends of a rocking lever 21, pivoted for free rocking movement with a rock shaft 41. Such shaft extends transversely of the path of the lumber and comprises part of the escapement mechanism already mentioned, and which also includes the continuously rotative cam 4. An arm 42 keyed upon the shaft 41 carries a cam follower roller 40 which is urged against the cam by the force of spring 22 connected to the lever 21. If the arm 42 is not held in a raised position, the cam follower 40 carried thereby will rise and fall in following the high and low points upon the cam 4 as the latter rotates. The accompanying rise and fall of the arm 42 and the consequent rocking of the shaft 40, hence of the lever 21, effects the described movements of the stop members 2 and presser feet 20.

The cam 4 is preferably rotated in synchronism with the advance of the pieces P by the chains 10. This is readily accomplished by employing a sprocket wheel 12 in mesh with the lower run of the chain 10, connected by a drive chain 13 to the cam shaft 49. Any other suitable drive may be employed, however.

Figure 2:
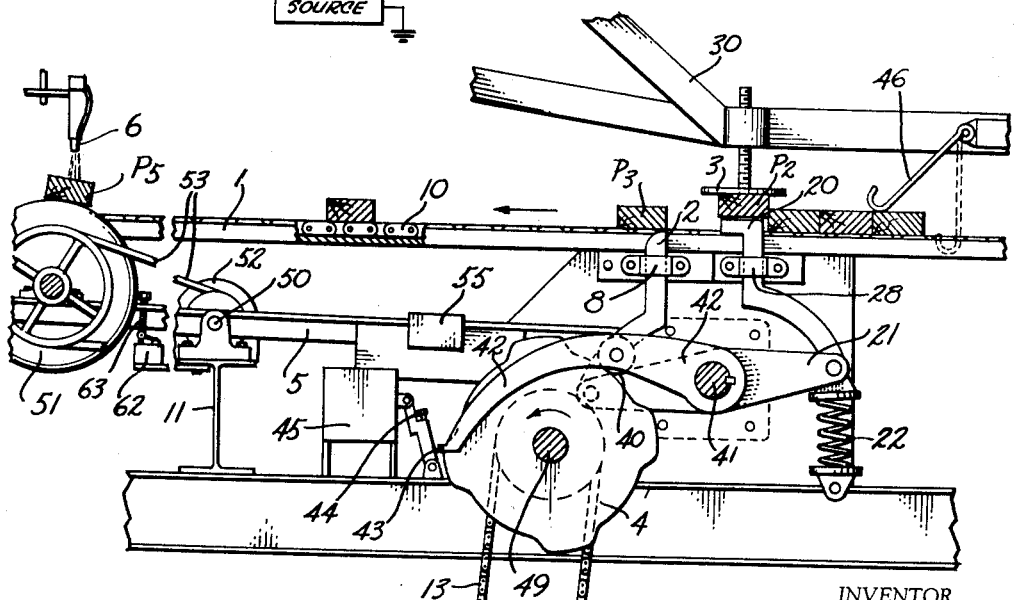
Figure 2 is an enlarged view, similar to Figure 1, with parts differently disposed.
Figure 3:
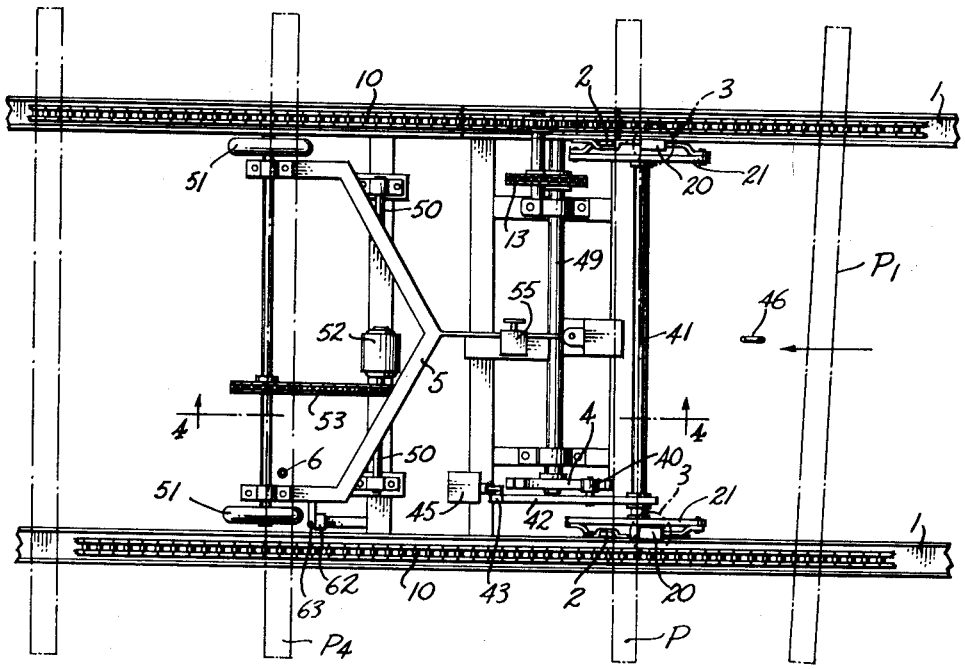
Figure 3 is a plan view, with the superstructure above the feed table omitted.
Figure 4:
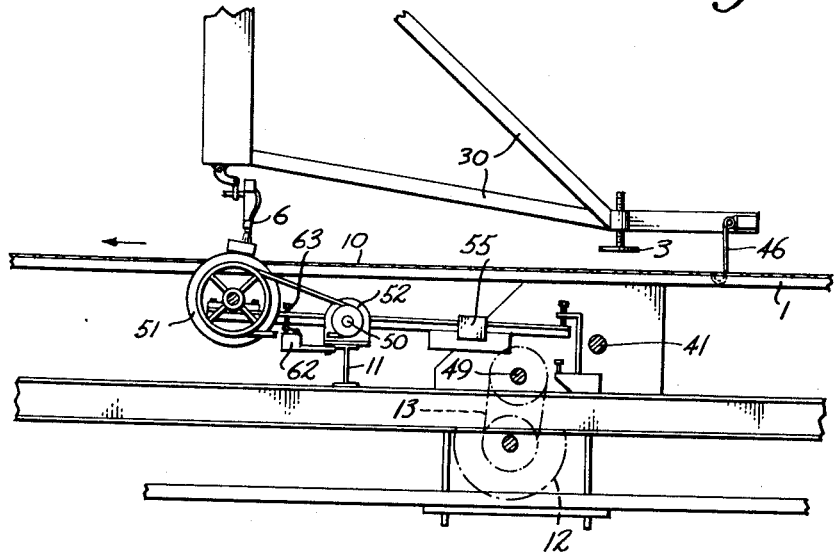
Figure 4 is a longitudinal section at the line 4—4 of Figure 3.

Preferably the arm 42 is locked each time it reaches its upraised position (corresponding to the upraised or stop position of stop members 2), and is released for descent only by advance to the stop station of pieces P following the halted piece P3, and then is automatically unlocked. A nose 43 at the tip of arm 42 will engage a lock element 44 when the arm is upraised, unless and until the lock element is withdrawn from its locking position. The locking position is seen in Figure 1, and the withdrawn position in Figure 2. The lock element 44 is biased into its locking position, by spring means (not shown) incorporated within a solenoid 45, and is tiltable therefrom by the solenoid 45 or equivalent device. A tiltable contact arm 46 depends from the superstructure 30 into the path of the advancing pieces P, and as it swings upwardly upon being contacted by such a piece, it energizes a circuit through solenoid 45, to retract element 44 and thereby unlock arm 42. When a high point of cam 4 passes beyond the follower 40, the unlocked arm 42 drops downwardly, the stop member 2 is withdrawn from the piece P3, which continues on past, and piece P2 and others following are held back by presser foot 20 and shoe 3.

Continued revolution of the cam 4 engages the next high point with the follower 40, and raises the arm 42, reversing the positions of members 2 and 20. Unless the contact arm 46 remains raised, the lock elements 44 and 43 reengage, and the cam 4 merely continues its rotation without affecting arm 42, advancing additional pieces to the stop station. If the contact arm 46 remains upraised, by advance of another piece P beneath it, the locking elements 44 and 43 remain disengaged, and the cam follower 40 follows the alternate low and high points of the cam, alternately lowering the stop member 2 and raising the same, to permit single pieces to advance in timed succession and spacing.

The individual pieces P, after they pass the stop members 2, proceed individually at spaced intervals along the table 1 until they pass the normally uptilted end of a scale beam 5 pivoted at 50 upon a fixed frame member 11. Preferably the scale beam tilts in a vertical plane parallel to the direction of advance. This normally uptilted end of the scale beam supports two wheels 51 spaced apart transversely of the feed table 1, which wheels are rubber-tired and of a size that the periphery of each projects normally above the level of the feed table. The wheels 51 are driven positively by a motor 52, also supported upon the frame member 11 at the tilting axis 50, the drive being indicated by the belt 53. Each piece, as for instance, the piece P4 in Figure 1, having been squared across the table, comes into contact with the two wheels 51 simultaneously and is carried thereby up and over such wheels, since the latter are positively driven and the rubber tires afford good frictional engagement with the piece. If the piece P4 is excessively moisture laden and is therefore over a given weight, it will tilt the scale beam 5 downwardly. The position of the counterweight 55 along the scale beam may be set with a high degree of precision to provide accurate weighing. The overweight piece P5 in Figure 2 has caused the beam to tilt. Marking of the overweight piece is effected in response to such tilting. If, however, the piece is not sufficiently heavy to tilt the scale beam, as is indicated by the piece P4 in Figure 1, the piece will merely ride over and past the wheels 51 and be delivered again upon the table, and will pass beyond the wheels to a collecting point to the left of the feed table.

The invention further includes means actuated by the depression of the scale beam to mark the piece which depressed the beam so that it can be subsequently identified and removed for further drying. Such a marking means may take any of various forms, but preferably is in the form of a nozzle 6 pointed at the piece as it passes the wheels 51 of the scale beam, together with means normally inactive but rendered active by the depression of the scale beam to discharge a marking fluid upon the scale beam through the nozzle. The nozzle is supplied with liquid from a supply tank 60, which is delivered under pressure upon the opening of a normally closed solenoid actuated valve 61. A switch 62, fixedly positioned to be closed by a depresser 63 on the scale beam, whenever the latter is tilted by an overweight piece, supplies current to the solenoid valve 61, to open the latter. Thereupon a spot of colored dye is sprayed upon the overweight piece, by which it is readily identified at a subsequent sorting station. Preferably the spray nozzle also includes the usual air jet (not shown) connected to an air compressor as illustrated in Figure 1. Closure of the switch at 62 is but momentary, and because of the spacing of the pieces only the overweight piece is marked. A single nozzle 6 is sufficient. Moreover, because of the spacing of the successive pieces approaching the scale beam effected by the escapement mechanism there is assurance that no more than one piece at a time will pass over the wheels 51 of the weighing device.

It will therefore be seen that the invention provides a novel and effective lumber grading mechanism operating on the principle of detecting and marking overweight, hence overly moisture laden pieces, and suitable for incorporation in a production line operation in modern stud mills or similar mill operations wherein such a problem may exist. The foregoing and other features and advantages of the invention will be evident to those skilled in the art.

I claim as my invention:

1. Mechanism for detecting and indicating which of like elongated lumber pieces contain excess moisture, comprising relatively wide conveyor means to advance such pieces along a given path with the pieces extending transversely to such path, means to space the individual pieces apart along said path and to advance them singly, a weight-sensitive scale element disposed in such path and normally upraised slightly above such path but inclined on the approach side of such pieces to permit such pieces to ride up and over the same, means supporting such scale element to be depressible by an overweight piece, said scale element having a lumber supporting means which has surface means spaced apart transversely to the length of such path to support such lumber pieces stably passing thereacross, said portions being narrow in width along said path relative to the width of said conveyor means transversely to said path, a normally inactive marking means positioned to mark all pieces as they pass over said scale element, and means automatically energizable by depression of said scale element to actuate said marking means, for marking a passing overweight piece.

2. Mechanism as and for the purpose indicated in claim 1, wherein the scale element comprises roller means having a peripheral surface projecting slightly above said path and means positively driving said roller means to advance pieces across the scale element.

3. Mechanism as and for the purpose indicated in claim 1, including means to halt advancing pieces at a stop station, in advance of the scale element, and escapement means operable for releasing single pieces from such stop station with spacing therebetween.

4. Mechanism for detecting and indicating which of like lumber pieces contain excess moisture, comprising means to advance such pieces along a given path, means to space the individual pieces and to advance them singly, a normally upraised weight-sensitive scale element disposed in such path, and depressible by an overweight piece, a normally inactive marking means positioned to mark all pieces as they pass said scale element, means automatically energizable by depression of said scale element to actuate said marking means, for marking a passing overweight piece, means to halt advancing pieces at a stop station, in advance of the scale element, and escapement means operable for releasing single pieces from such stop station with spacing therebetween, including means to lock the escapement means and the halting means in stopping position, and means including an element in the path of advance of pieces towards the stop station, and actuated by advance thereto of additional pieces to release said lock means.

5. Mechanism for detecting and indicating lumber pieces which contain excess moisture, comprising a table and means to advance like pieces of lumber edgewise along said table, means to halt the advancing pieces and to orient them directly crosswise of the table, means to release successive lumber pieces so halted, for advance singly beyond the halting means, a tiltable scale beam normally uptilted at one end in the path of the singly advancing pieces, for tilting downwardly by an overweight piece as it passes, a normally inactive marking means positioned to mark the pieces as they pass the uptilted end of the scale beam, and means energizable by downtilting of such end of the scale beam to actuate said marking means, to mark each overweight piece.

6. Mechanism as and for the purpose indicated in claim 5, including driven conveyor means carried by the normally uptilted end of the scale beam for advancing lumber pieces thereover.

7. Mechanism as and for the purpose indicated in claim 5, wherein the driven conveyor means includes a friction wheel rotatively mounted upon the normally uptilted end of the scale beam and the upper portions of which projects normally above the table level, for engagement with passing lumber pieces, and means carried by the scale beam for rotating said friction wheel in the sense to advance the passing pieces.

8. Mechanism as and for the purpose indicated in claim 5, wherein the marking means includes a fluid nozzle directed towards a lumber piece as it passes the normally uptilted end of the scale beam, a marking fluid reservoir, and valve means controlling discharge of such fluid from said reservoir, operatively connected to the actuating means to be opened thereby.

9. Mechanism for detecting and indicating lumber pieces which contain excess moisture, comprising a table, conveyor means to advance like pieces of lumber edgewise along said table, stop means spaced transversely of the path of advance of the lumber pieces, and guided for movement between an upraised stopping position in the path of the advancing pieces, to orient them directly transversely, and a depressed lumber-releasing position, a presser foot located in advance of said stop means and guided for movement between a depressed inactive position and an elevated position, a shoe fixedly positioned above the presser foot to clamp a lumber piece upraised by the latter above the table, to hold back all following pieces of lumber, means interconnecting the stop means and the presser foot for conjoint but opposite movements, escapement means driven in synchronism with the lumber advancing means to alternately raise and lower said stop means for release of successive lumber pieces for advance singly therebeyond, a scale beam tiltable from a normal position wherein one end is uptilted in the path of advance of the single pieces, to a depressed position, and balanced to be so tiltable by a passing piece overweight with excess moisture, a normally inactive marking means positioned to mark each piece as it passes the uptilted end of the scale beam, and means energizable by downtilting of such end of the scale beam to actuate said marking means.

10. Mechanism for detecting and indicating lumber pieces which contain excess moisture, comprising feed means to support and advance like pieces of lumber edgewise along a given path, stop means normally disposed in said path to halt the advancing pieces, escapement means operable to hold back all pieces except the leading piece, and to remove the stop means from the path of the leading piece for advance singly, a scale beam fulcrumed for tilting in a vertical plane parallel to the path of advance, and balanced to maintain one end uptilted in the path of advance, beyond the stop means, but to be depressed by an overweight piece as it passes thereover, a fluid nozzle directed towards each piece as it passes over the uptilted end of the scale beam, and means operatively connected to the scale beam and to said nozzle, and energizable by depression of the scale beam, to discharge a marking fluid from said nozzle onto the passing piece of lumber.

11. Mechanism as and for the purpose indicated in claim 10, including a friction wheel journaled upon the normally uptilted end of the scale beam, in the path of the lumber pieces, and power means to rotate said wheel to advance pieces thereover, although they may not depress such end of the scale beam.

12. Mechanism for detecting and indicating which of like lumber pieces contain excess moisture, including means to advance such pieces along a given path, stop means in such path normally upraised to halt such pieces, a rotative cam having successive high and low points, means to rotate said cam continuously, a cam follower means operatively connected to said cam and said stop means to depress the latter at the low points and to raise the same at the high points, lock means positioned to engage said cam follower means and to lock the same in stop-raised position, and means positioned in the path of and energizable by a following piece to release said lock means for advance of the stopped piece.

13. Mechanism as and for the purpose indicated in claim 12, including hold-back means positioned for engagement with the piece following a halted piece, and means interconnecting the stop means and said hold-back means to actuate the latter during depression of the stop means, and to deenergize the hold-back means upon reraising of the stop means.

14. Mechanism as and for the purpose indicated in claim 9, wherein the escapement means includes a rotative cam driven synchronously with the conveyor means, follower means actuated periodically by said cam to raise said stop means, locking means operable to hold said follower means normally in its actuated position maintaining said stop means raised, and release means including a sensing element positioned in advance of the presser foot and adapted to be actuated by advance of a following lumber piece towards the presser foot, and means connected for energization by said sensing element upon actuation of the latter, and connected so that when energized it will release said locking means to permit lowering of said stop means.

15. An apparatus for weighing pieces of lumber to detect those over a predetermined weight, comprising conveyor means operable to advance a succession of such pieces impositively along a selected path generally perpendicular to the length dimension of such pieces, stop means in said path engaged by the lumber pieces successively and operable thereby to orient such pieces accurately perpendicularly to such path, means in said path arresting the lumber pieces temporarily to create spacing between each piece and those which follow it and which are so arrested, and scale means in said path, engageable by the oriented, spaced pieces successively to detect those which exceed said predetermined weight, said scale means including a pair of driven conveyor elements spaced apart and aligned transversely of said path and simultaneously engageable by each piece passing said stop means, said scale means driven conveyor elements comprising a pair of wheel-like elements the upper peripheries of which project slightly above the path of movement of the bottom faces of the lumber pieces advancing on the first-mentioned conveyor means.

References Cited in the file of this patent

UNITED STATES PATENTS

| | | |
|---|---|---|
| 1,617,301 | Reddick | Feb. 8, 1927 |
| 2,264,873 | Cockrell | Dec. 2, 1941 |
| 2,312,626 | Chamberlin et al. | Mar. 2, 1943 |
| 2,515,412 | Lee | July 18, 1950 |
| 2,633,972 | Capstack et al. | Apr. 7, 1953 |
| 2,679,919 | De Koning | June 1, 1954 |
| 2,730,233 | Coleman et al. | Jan. 10, 1956 |
| 2,743,604 | Stein et al. | May 1, 1956 |
| 2,761,545 | Hoagland | Sept. 4, 1956 |
| 2,794,534 | Forrester | June 4, 1957 |

UNITED STATES PATENT OFFICE

CERTIFICATE OF CORRECTION

Patent No. 2,941,793            June 21, 1960

Robert Gene Grant

It is hereby certified that error appears in the printed specification of the above numbered patent requiring correction and that the said Letters Patent should read as corrected below.

Column 4, line 38, for the claim reference numeral "1" read -- 2 --; column 5, line 7, for "portions" read -- portion --.

Signed and sealed this 29th day of November 1960.

(SEAL)
Attest:
KARL H. AXLINE
Attesting Officer

ROBERT C. WATSON
Commissioner of Patents